United States Patent [19]
Beveridge et al.

[11] Patent Number: 5,857,323
[45] Date of Patent: Jan. 12, 1999

[54] ROCKET ENGINE BURNER WITH POROUS METAL INJECTOR FOR THROTTLING OVER A LARGE THRUST RANGE

[75] Inventors: John H. Beveridge, San Clemente, Calif.; Alvin L. Murray, Madison, Ala.

[73] Assignee: Aerotherm Corporation, a Subsidiary of Dyncorp, Mountain View, Calif.

[21] Appl. No.: 521,392

[22] Filed: Aug. 22, 1995

[51] Int. Cl.⁶ .................................................. F02K 9/00
[52] U.S. Cl. .................. 60/258; 60/39.465; 60/39.06; 239/424.5; 431/11; 431/243
[58] Field of Search .................. 60/257, 258, 39.465, 60/39.11, 39.06; 239/424.5, 433, 438; 431/11, 243, 159, 181, 189, 353, 354

[56] References Cited

U.S. PATENT DOCUMENTS

| | | | |
|---|---|---|---|
| 3,446,023 | 5/1969 | Mosier | 60/257 |
| 3,581,495 | 6/1971 | Kah | 60/258 |
| 4,478,045 | 10/1984 | Shekleton | 60/39.11 |
| 4,936,091 | 6/1990 | Schoenman | 60/258 |

FOREIGN PATENT DOCUMENTS

| | | | |
|---|---|---|---|
| 68511 | 5/1980 | Japan | 431/243 |

OTHER PUBLICATIONS

"Porous Metals for High Performance", *Mechanical Engineering*, vol. 16 (6) :32, (1994).

*Primary Examiner*—Charles G. Freay
*Attorney, Agent, or Firm*—Stephen M. Knauer; Flehr Hohbach Test Albritton & Herbert LLP

[57] ABSTRACT

A rocket engine burner for throttling over a large thrust range from full thrust to very low thrust. The rocket engine burner comprises a propellant injector assembly, a combustion chamber, and an ignitor. The propellant injector assembly comprises one or more hollow injectors and a secondary propellant manifold in communication with the hollow injectors to provide them with a secondary propellant. The propellant injector assembly also includes a primary propellant manifold and a porous injector that extends across the inlet of the combustion chamber and is in communication with the primary propellant manifold to receive the primary propellant. The primary propellant flows through the porous injector and is injected into the combustion chamber. The porous injector has one or more openings through it which receive the hollow injectors. The secondary propellant flows through the hollow injectors and is injected into the combustion chamber. The ignitor is in communication with the combustion chamber to ignite the injected primary and secondary propellants to produce combustion products that exit the outlet of the combustion chamber.

14 Claims, 1 Drawing Sheet

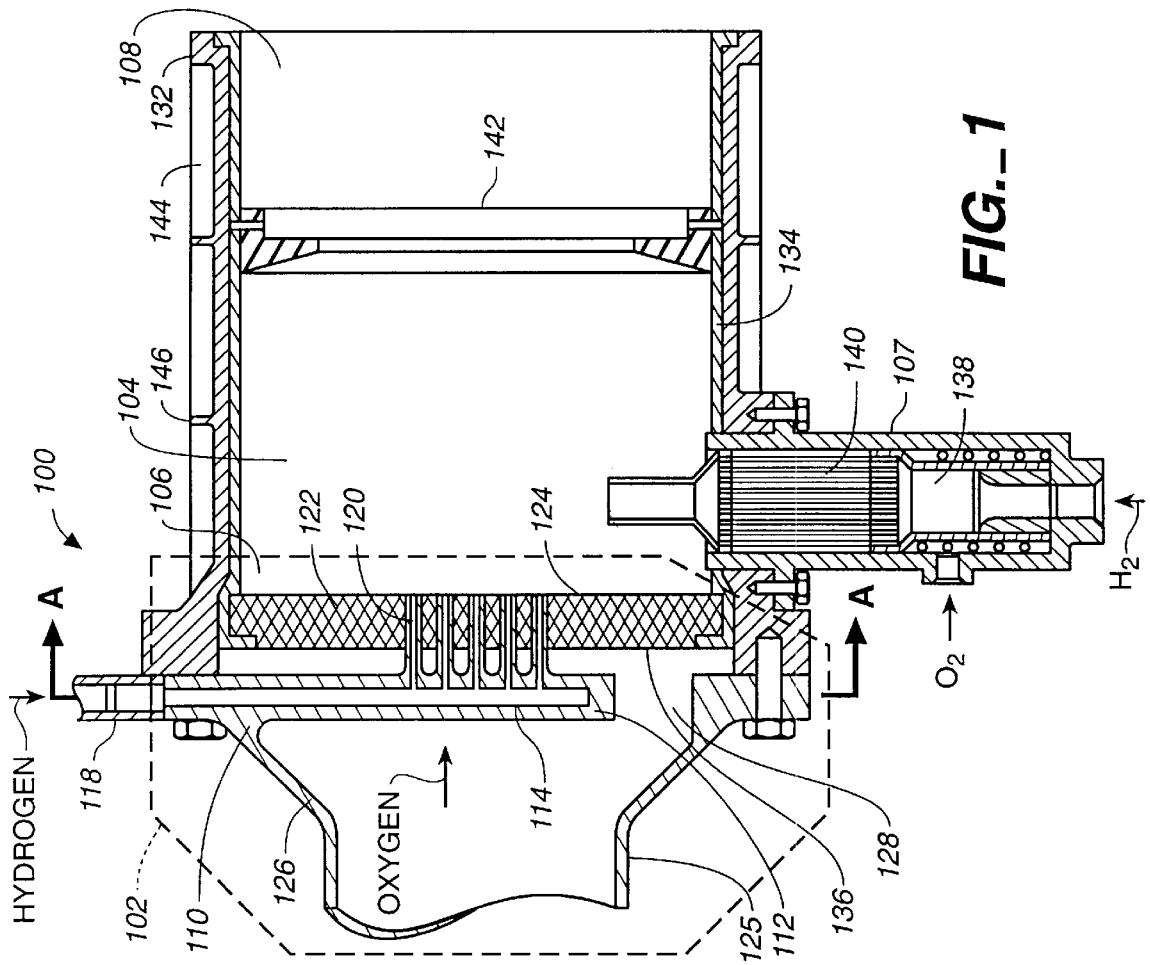
FIG._1
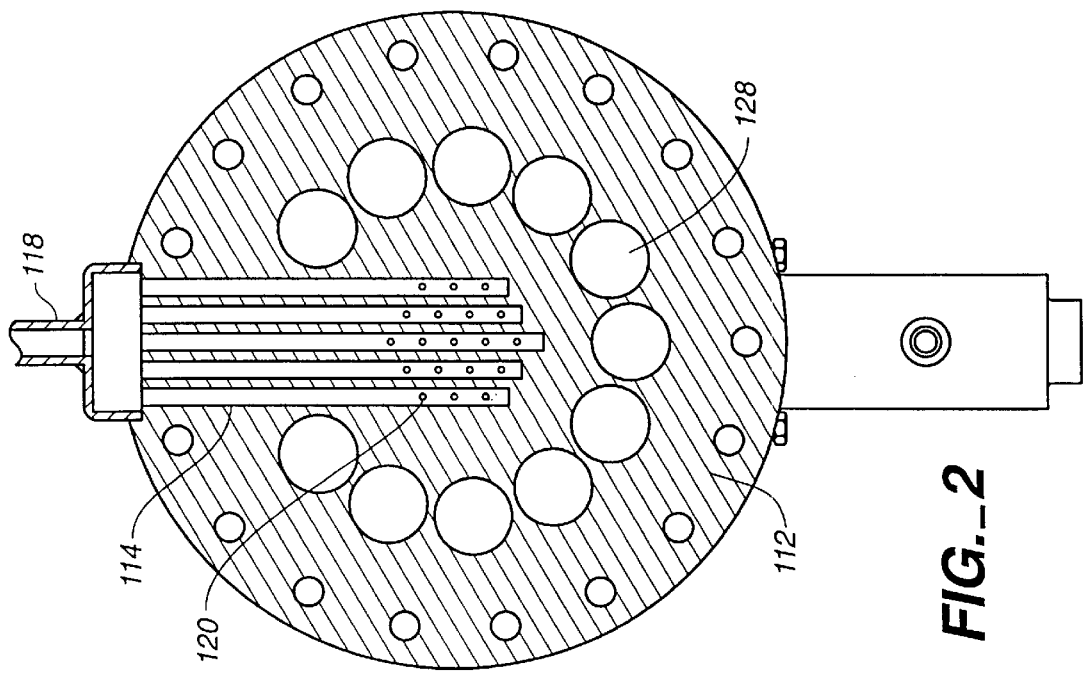
FIG._2

ROCKET ENGINE BURNER WITH POROUS METAL INJECTOR FOR THROTTLING OVER A LARGE THRUST RANGE

FIELD OF INVENTION

The present invention relates generally to propellant injector assemblies of rocket engine burners. More specifically, the present invention pertains to a propellant injector assembly that has a porous injector to inject a primary propellant.

BACKGROUND OF INVENTION

A rocket engine for single-stage-to-orbit (SSTO) application must operate at high thrust at lift off, moderate thrust later in the flight, and very low thrust (i.e., ≈10%) during vehicle landing. Reduced thrust operation involves reduced flow rates of the propellants and therefore reduced pressure in the combustion chamber.

Conventional liquid propellant rocket engines use the fuel propellant (e.g., hydrogen) to regeneratively cool the walls of the combustion chamber and nozzle(s). The heat transfer involved in this process and the work done in pumping the fuel to the combustion chamber, nozzle(s), and propellant injector assembly adds sufficient heat to the fuel such that it is converted from a liquid to a high pressure compressible fluid. Thus, as the pressure in the combustion chamber is reduced (i.e., as flow rates are reduced) from high pressure at full thrust to low pressure at low thrust, the density of the compressible fuel is correspondingly reduced and the injection velocity of the fuel exiting the fuel injector(s) of the propellant injector assembly into the combustion chamber remains approximately constant.

However, the oxidizer (e.g., oxygen) is not heated enough by heat transfer and/or by being pumped to the propellant injector assembly to cause it to be converted from a liquid to a compressible fluid. Thus, as pressure in the combustion chamber is reduced from high pressure at full thrust to low pressure at low thrust, the density of the oxidizer injected into the combustion chamber by the conventional oxidizer injector(s) of the propellant injector assembly remains approximately constant. This results in the pressure drop of the oxidizer across these injector(s) being proportional to the square of the flow rate. For example, with a 100 psi pressure drop at 100% flow rate (i.e., full thrust), the pressure drop at 10% flow rate (i.e., very low thrust) is 1 psi ($100 \times (0.10)^2$). Such a pressure drop at very low flow rate is insufficient to provide uniform flow distribution and stable combustion.

SUMMARY OF INVENTION

The foregoing problems are solved by a rocket engine burner that is capable of throttling over a large thrust range from full thrust to very low thrust. The rocket engine burner comprises a novel propellant injector assembly, a combustion chamber, and an ignitor.

The propellant injector assembly includes a primary propellant manifold and a novel porous injector that extends across the inlet of the combustion chamber and is in communication with the primary propellant manifold to receive a primary propellant (e.g., an oxidizer such as oxygen) that has not been preheated enough to become a compressible fluid. The primary propellant flows in a laminar flow through the porous injector and is injected into the combustion chamber. As a result, the pressure drop of the primary propellant across the porous injector is approximately linear with its flow rate.

The propellant injector assembly also comprises one or more hollow secondary propellant injectors and a secondary propellant manifold. The secondary propellant manifold is in communication with the hollow injectors to provide them with a secondary propellant (e.g., a fuel such as hydrogen) that has been preheated sufficiently to become a compressible fluid. The porous injector has one or more orifices to receive the hollow secondary propellant injectors. The secondary propellant flows through the hollow secondary propellant injectors and is injected into the combustion chamber. Since the secondary propellant is a compressible fluid, its injection velocity remains approximately constant despite changes in its flow rate.

The ignitor is in communication with the combustion chamber to ignite the injected primary and secondary propellants to produce combustion products that exit the outlet of the combustion chamber. Since the injection velocity of the secondary propellant remains approximately constant despite changes in its flow rate and the pressure drop of the primary propellant across the porous injector is approximately linear with its flow rate, stable combustion is provided over the full thrust range of the rocket engine burner. Moreover, the porous injector also acts as a strong acoustic (i.e., sound) damper for the rocket engine burner. This adds significantly to combustion stability by suppressing combustion induced acoustic pressure waves (i.e., noise) within the rocket engine burner.

BRIEF DESCRIPTION OF THE DRAWINGS

FIG. 1 shows a cross sectional side view of a rocket engine burner in accordance with the present invention.

FIG. 2 shows a cross sectional front view of the injector assembly of the rocket engine burner of FIG. 1 along the line A—A.

DESCRIPTION OF SPECIFIC EMBODIMENTS

FIG. 1 shows a burner 100 of a rocket engine. During operation of the rocket engine, the primary propellant source and the secondary propellant source (not shown) of the rocket engine respectively pump or supply the propellant injector assembly 102 with a primary propellant and a secondary propellant. The secondary propellant may be a fuel, such as hydrogen or liquid natural gas. The primary propellant may be an oxidizer, such as oxygen. The injector assembly 102 injects the propellants into the combustion chamber 104 at the inlet 106 of the combustion chamber 104. The ignitor 107 then ignites the injected propellants. The products of the combustion exit the outlet 108 of the combustion chamber 104 into one or more nozzles (not shown) of the rocket engine.

The injector body 110 of the injector assembly 102 includes a secondary propellant manifold 112, one or more hollow injectors 120, and a primary propellant manifold 125 that are all integrally formed and connected. The injector body may comprise nickel or a nickel alloy.

The injector body 110 is mounted to the case (or housing) 132 of the combustion chamber 104 at the inlet 106. As a result, the disk (or plate) shaped secondary propellant manifold 112 extends across the inlet 106. As shown in FIG. 2, the secondary propellant manifold 112 has one or more internal cylindrical passages 114. The secondary propellant source provides the secondary propellant to the passages 114 via the secondary propellant feed line 118. The secondary propellant source varies the flow rate of the secondary propellant depending on the amount of flow required for a desired thrust level.

As shown in FIG. 1, the hollow injectors 120 are tubular and extend from the secondary propellant manifold 112 substantially perpendicular to the passages 114. The disk (or plate) shaped porous injector 122 has one or more orifices (or provisions or openings) through it which receive the hollow injectors 120. The hollow injectors 120 are connected to and in communication with the passages 114 so as to receive the secondary propellant from the passages 114.

The received secondary propellant then flows through the orifices of the hollow injectors 120 and is injected into the combustion chamber 104 at the injector face (or surface) 124 of the porous injector 122.

The primary propellant is provided to the primary propellant manifold 125 by the primary propellant source. Similar to the secondary propellant source, the primary propellant source varies the flow rate of the primary propellant depending on the flow required.

In the flow of the primary propellant, the primary propellant manifold 125 and the porous injector 122 are respectively upstream and downstream of the secondary propellant manifold 112. Moreover, the mouth 126 of the primary propellant manifold 125 opens and extends across the secondary propellant manifold 112. And, referring to FIG. 2, the secondary propellant manifold 112 has one or more openings (or holes) 128 through it. Turning back to FIG. 1, the primary propellant flows from the mouth 126 of the primary propellant manifold 125 through the openings 128 of the secondary propellant manifold 112 to the propellant receiving face (or surface) 136 of the porous injector 122. Thus, the primary propellant manifold 125 is in communication with the porous injector 122 to provide it with the primary propellant.

The porous injector 122 is mounted to the liner 134 in the inlet 106 of the combustion chamber 104 and extends across the inlet 106. The porous injector 122 comprises a porous metal material. This material may comprise a commercially available sintered stainless steel, Iconel, Monel, nickel, or molybdenum woven wire mesh such as PSS, Regimesh, or Supramesh. Thus, the primary propellant flows through the porous injector 122 and is injected into the combustion chamber 104 at the injector face 124 of the porous injector 122.

The primary propellant is not preheated enough by the primary propellant source to cause it to become a compressible gas. However, since there is a laminar flow of the primary propellant across the porous injector 122, the pressure drop of the primary propellant across the porous injector 122 is approximately linear with its flow rate.

However, the secondary propellant is preheated by the secondary propellant source to a temperature at which it becomes a compressible gas whose density changes with pressure. This is desirable because it results in the injection velocity of the secondary propellant exiting the hollow injectors 120 being approximately constant despite changes in its flow rate.

Since the injection velocity of the secondary propellant is approximately constant with its flow rate and the pressure drop of the primary propellant across the porous injector is approximately linear with its flow rate, stable combustion over the entire thrust range of the rocket engine operation is maintained. Specifically, stable combustion is achieved for throttling over the range of full thrust to very low thrust (i.e., ≈10%). This is quite different from conventional propellant injector assemblies where, as discussed earlier, combustion instabilities occur at very low thrust because the pressure drop of the primary propellant across the propellant injector assembly is proportional to the square of its flow rate.

Furthermore, the cold primary propellant flowing through the porous injector 122 cools the injector face 124. This keeps the combustion zone in the combustion chamber 104 away from the injector face 124. And, since the hollow injectors 120 and the openings in the porous injector 122 which receive them are coaxial and concentrated near the center of the porous injector 122, the secondary propellant is injected near the center of the combustion chamber 104. As a result, the combustion zone is confined to the center of the combustion chamber 104 away from the liner 134. In order to further isolate the combustion zone from the liner 134, some of the primary propellant provided by the primary propellant manifold 125 may be injected into the combustion chamber 104 at various points along the liner 134, as those skilled in the art will recognize.

The velocity of the secondary propellant injected by the hollow injectors 120 is large relative to the velocity of the primary propellant injected by the porous injector 122. This creates high shear which promotes rapid and turbulent mixing and combustion of the primary and secondary propellants to provide more uniform temperatures and mass profiles at the outlet 108.

In order to ignite the injected primary and secondary propellants, the burner 100 includes the ignitor 107. The liner 134 and the case 132 have openings that receive the ignitor 107. The ignitor 107 is mounted to the case 132 so that it is in communication with the combustion chamber 104 to ignite the injected secondary propellant and primary propellant. The ignitor may be a pyrotechnic ignitor, a torch ignitor, a catalytic ignitor, a hypergolic ignitor, a laser ignitor, or some other propellant ignitor.

In the embodiment shown in FIG. 2, the ignitor 107 is a catalytic ignitor that extends into the combustion chamber 104. As shown, hydrogen and oxygen enter the mixing chamber 138 of the ignitor 107 at right angles to enhance mixing. The mixture then flows through the catalyst 140 which ignites the mixture. The resulting torch flame extends into the confined combustion zone of the combustion chamber 104 and ignites the injected secondary and primary propellants. The catalytic ignitor 107 may be of the type that utilizes a Shell 405 catalyst which is commercially available.

The turbulator 142 is mounted to the liner 134 of the combustion chamber 104 downstream from the combustion zone. The turbulator 142 produces vortices that mix the combustion products with the injected primary propellant that remains outside of the combustion zone. This provides for more uniform mass and temperature distributions at the outlet 108.

The porous injector 122 also acts as a strong acoustic (i.e., sound) damper for the burner 100. Thus, it suppresses combustion induced acoustic pressure waves (i.e., noise) within the burner 100 which adds significantly to combustion stability.

The case 132 may comprise a high strength material, such as Monel or a composite material. In order to increase the strength of the case 132, longitudinal stiffness ribs 144 and circumferential stiffness ribs 146 may be used. The liner 134 within the case 132 may comprise a material that is resistant to ignition, such as Monel.

Furthermore, while the present invention has been described with reference to a few specific embodiments, the description is illustrative of the invention and is not to be construed as limiting the invention. For example, the secondary propellant may be an oxidizer of the type described earlier and the primary propellant may be a fuel of the type described earlier. Various modifications may occur to those skilled in the art without departing from the true spirit and scope of the invention as defined by the appended claims.

What is claimed is:

1. A rocket engine with stable combustion over a thrust range of full thrust to very low thrust, the rocket engine comprising:
a secondary propellant source that provides a gaseous fuel at a flow rate that varies over the thrust range;
a primary propellant source that provides a liquid oxidizer at a flow rate that varies over the thrust range;
a rocket engine burner comprising:
a combustion chamber having an inlet and an outlet;
a propellant injector assembly comprising:
one or more hollow injectors;
a porous injector that extends across the inlet of the combustion chamber and has one or more openings therethrough to receive the hollow injectors;
a secondary propellant manifold in communication with the secondary propellant source and the hollow injectors to provide the hollow injectors with the gaseous fuel, the provided gaseous fuel flowing through the hollow injectors and being injected into the combustion chamber with an injection velocity that is approximately constant despite changes in the flow rate of the gaseous fuel; and
a primary propellant manifold in communication with the primary propellant source and the porous injector to provide the porous injector with the liquid oxidizer, the provided liquid oxidizer flowing through the porous injector and being injected into the combustion chamber with a pressure drop across the porous injector that is approximately linear with changes in the flow rate of the liquid oxidizer; and
an ignitor in communication with the combustion chamber to ignite the injected gaseous fuel and liquid oxidizer to produce the stable combustion over the thrust range as the flow rates of the gaseous fuel and the liquid oxidizer are varied, the stable combustion having combustion products that exit the outlet of the combustion chamber.

2. The rocket engine of claim 1 wherein the porous injector comprises a porous metal.

3. The rocket engine of claim 2 wherein the porous metal comprises a woven wire mesh.

4. The rocket engine of claim 1 wherein:
the porous injector is disposed downstream from the secondary propellant manifold;
the secondary propellant manifold extends across the inlet of the combustion chamber and has internal passages to provide the gaseous fuel to the hollow injectors;
the primary propellant manifold is disposed upstream from the secondary propellant manifold and has a mouth that opens across the secondary propellant manifold; and
the secondary propellant manifold has one or more openings therethrough so that the liquid oxidizer flows from the mouth of the primary propellant manifold through the openings of the secondary propellant manifold to the porous injector.

5. The rocket engine of claim 4 wherein the porous injector and the secondary propellant manifold are plate shaped.

6. The rocket engine of claim 5 wherein the hollow injectors and the openings of the porous injector which receive the hollow injectors are concentrated near the center of the porous injector.

7. The rocket engine of claim 1 wherein:
the porous injector is plate shaped;
the hollow injectors and the openings of the porous injector which receive the hollow injectors are concentrated near the center of the porous injector.

8. A method of providing stable combustion in a rocket engine burner over a thrust range of full thrust to very low thrust of a rocket engine in which the rocket engine burner is used, the method comprising:
providing the rocket engine burner with a combustion chamber and a propellant injector assembly, the combustion chamber having an inlet and an outlet, the propellant injector assembly comprising one or more hollow injectors and a porous injector that extends across an inlet of the combustion chamber and has one or more openings therethrough to receive the hollow injectors,
providing the hollow injectors with a gaseous fuel at a flow rate that varies over the thrust range, the gaseous fuel flowing through the hollow injectors and being injected into the combustion chamber with an injection velocity that is approximately constant despite changes in the flow rate of the gaseous fuel;
providing the porous injector with a liquid oxidizer at a flow rate that varies over the thrust range, the liquid oxidizer flowing through the porous injector and being injected into the combustion chamber with a pressure drop across the porous injector that is approximately linear with changes in the flow rate of the liquid oxidizer; and
igniting the injected primary and secondary propellants to produce the stable combustion over the thrust range as the flow rates of the gaseous fuel and the liquid oxidizer are varied, the combustion having combustion products that exit the outlet of the combustion chamber.

9. The method of claim 8 wherein the porous injector comprises a porous metal.

10. The method of claim 9 wherein the porous metal comprises a woven wire mesh.

11. The method of claim 8 wherein:
the porous injector is disposed downstream from the secondary propellant manifold;
the secondary propellant manifold extends across the inlet of the combustion chamber and has internal passages to provide the gaseous fuel to the hollow injectors;
the primary propellant manifold is disposed upstream from the secondary propellant manifold and has a mouth that opens across the secondary propellant manifold; and
the secondary propellant manifold has one or more openings therethrough so that the liquid oxidizer flows from the mouth of the primary propellant manifold through the openings of the secondary propellant manifold to the porous injector.

12. The method of claim 11 wherein the porous injector and the secondary propellant manifold are plate shaped.

13. The method of claim 12 wherein the hollow injectors and the openings of the porous injector which receive the hollow injectors are concentrated near the center of the porous injector.

14. The method of claim 8 wherein:
the porous injector is plate shaped;
the hollow injectors and the openings of the porous injector which receive the hollow injectors are concentrated near the center of the porous injector.

* * * * *